United States Patent [19]
Yano

[11] Patent Number: 5,999,879
[45] Date of Patent: Dec. 7, 1999

[54] NAVIGATION APPARATUS WITH SHAPE CHANGE DISPLAY FUNCTION

[75] Inventor: Kenichiro Yano, Kawagoe, Japan

[73] Assignee: Pioneer Electronic Corporation, Japan

[21] Appl. No.: 08/839,823

[22] Filed: Apr. 18, 1997

[30] Foreign Application Priority Data

Apr. 26, 1996 [JP] Japan ................................ 8-130789

[51] Int. Cl.$^6$ ................................................... G06G 7/78
[52] U.S. Cl. ................... 701/208; 701/211; 701/212; 73/178 R; 340/988; 340/995
[58] Field of Search ................. 701/208, 207, 701/200, 201, 209, 213, 117, 118, 210, 211; 340/988, 990, 995; 345/438, 428, 439, 429, 433, 443, 133, 139

[56] References Cited

U.S. PATENT DOCUMENTS

| | | | |
|---|---|---|---|
| 4,543,572 | 9/1985 | Tanaka et al. | 701/208 |
| 4,737,916 | 4/1988 | Ogawa et al. | 701/200 |
| 4,890,233 | 12/1989 | Ando et al. | 701/224 |
| 5,396,430 | 3/1995 | Arakawa et al. | 701/200 |
| 5,710,600 | 1/1998 | Ishii et al. | 701/207 |
| 5,732,385 | 3/1998 | NAkayama et al. | 701/201 |
| 5,748,109 | 5/1998 | Kosaka et al. | 701/202 |
| 5,757,290 | 5/1998 | Watanabe et al. | 701/200 |
| 5,884,218 | 3/1999 | Nimura et al. | 701/208 |
| 5,890,088 | 3/1999 | Nimura et al. | 701/208 |

*Primary Examiner*—Jacques H. Louis-Jacques
*Attorney, Agent, or Firm*—Evenson, McKeown, Edwards & Lenahan, P.L.L.C.

[57] ABSTRACT

A navigation apparatus which can preferentially recognize important information on a map hidden by buildings, mountains, etc. Which were stereoscopically displayed and enables a set route or a present position of a vehicle to be easily recognized. A navigation apparatus has: a recording medium on which at least map data having a road and shape data which is included in the map data and serves as a main landmark object to recognize a feature of a map have been recorded; an image forming unit for forming image information when the map data is seen from a desired sight point position on the basis of the map data and the shape data; a display unit for displaying on the basis of the image information formed by the image forming unit; and a control unit for controlling the recording medium, image forming unit, and display unit. The control unit controls a shape data changing unit to change at least a part of the shape data on the basis of at least the map data and also controls the image forming unit to form the image information on the basis of the map data, the shape data, and shape data changed by the shape data changing unit.

10 Claims, 18 Drawing Sheets

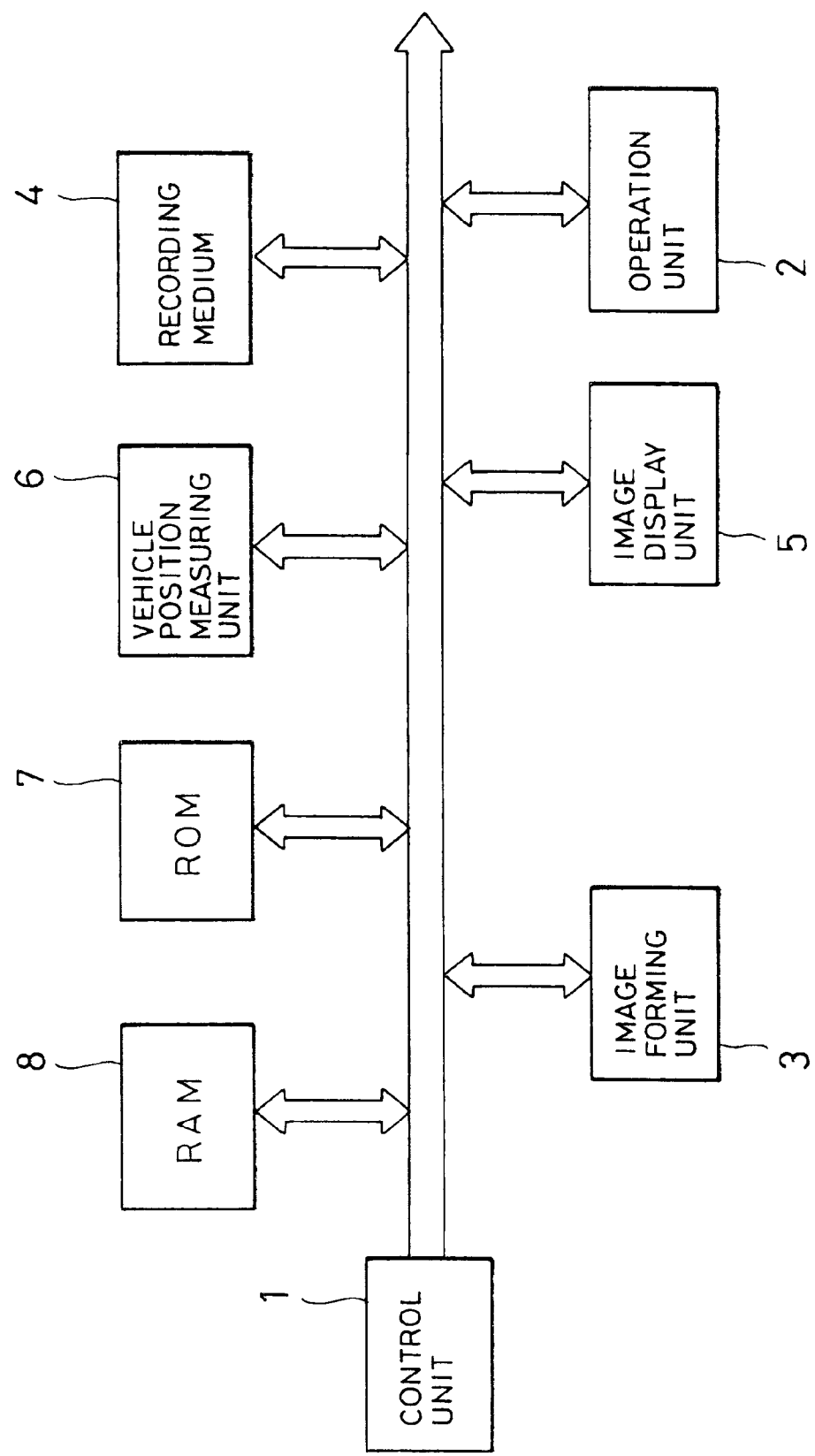

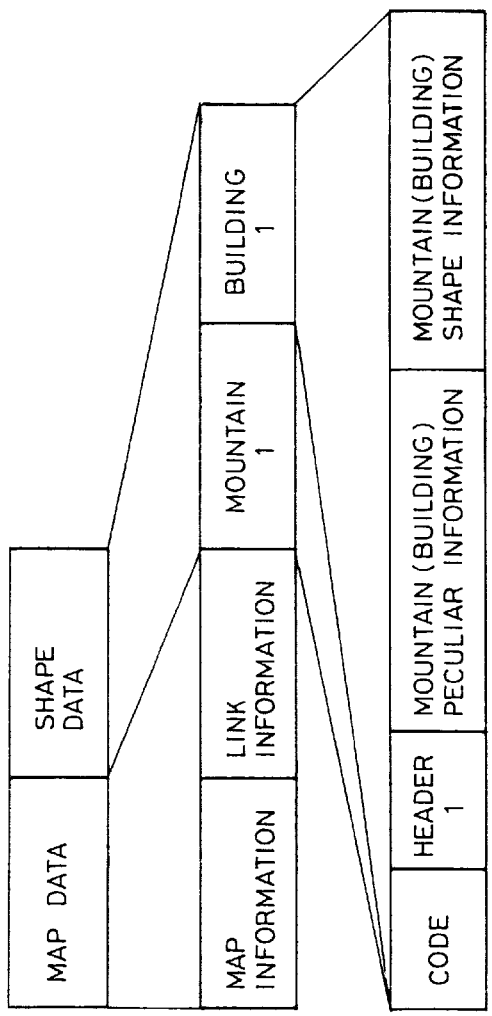
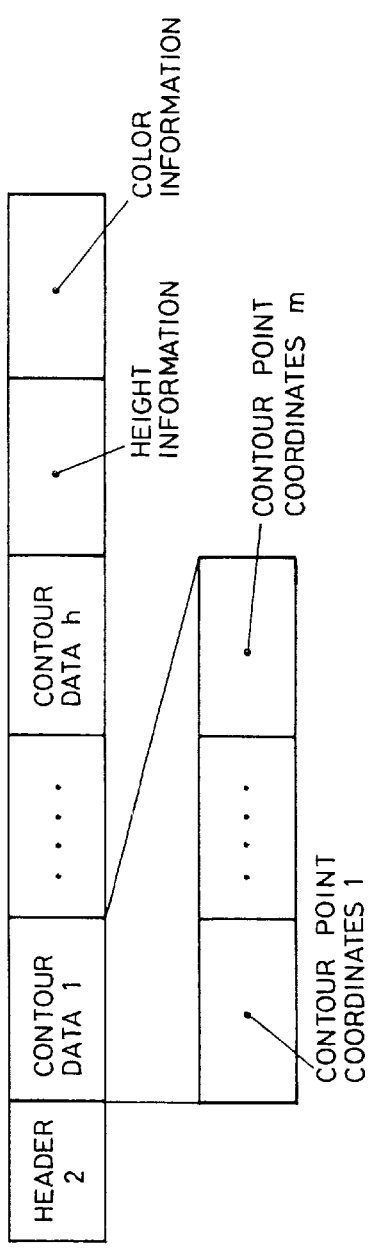
FIG. 2A
FIG. 2B
FIG. 2C
FIG. 2D

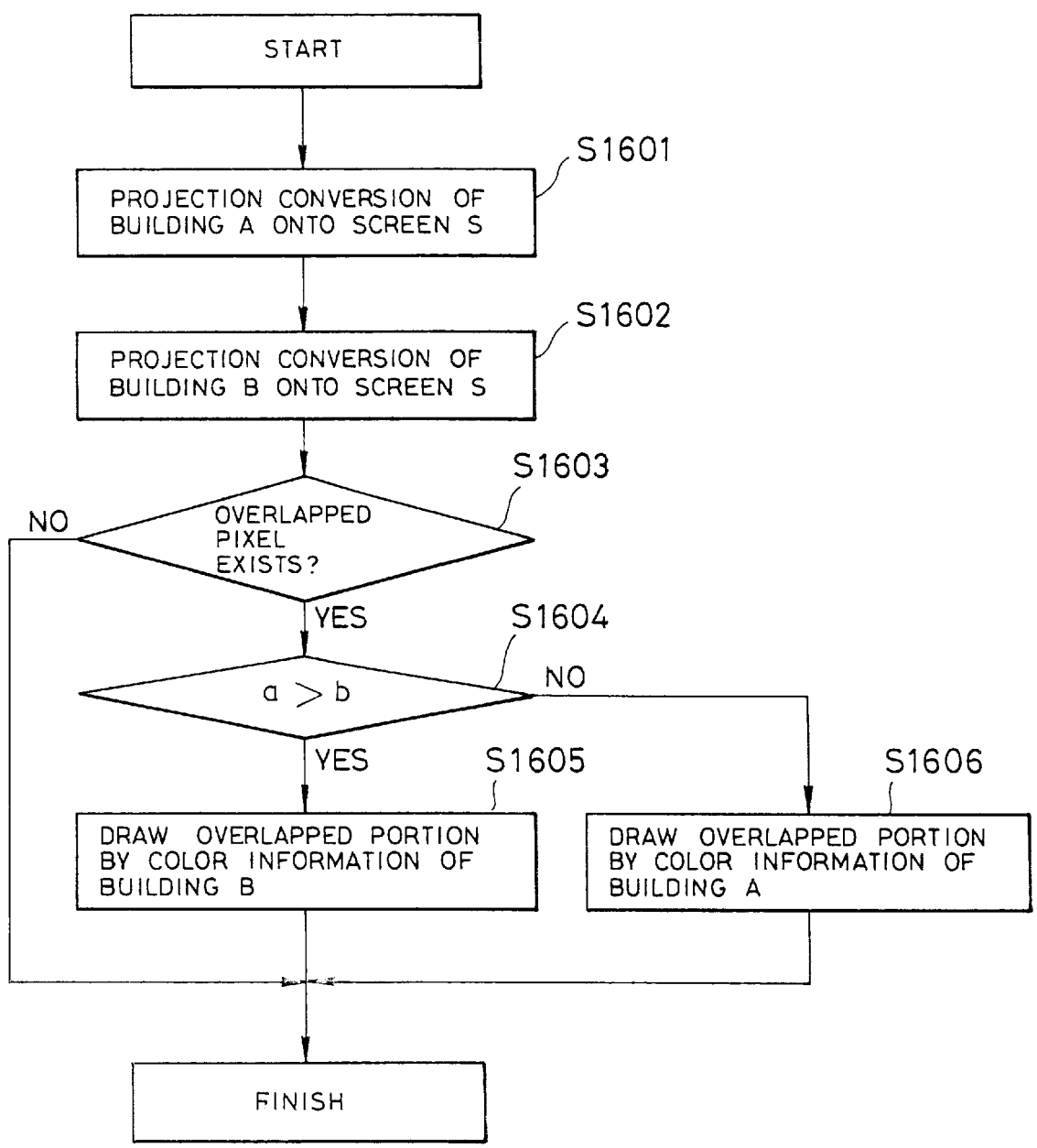

NAVIGATION APPARATUS WITH SHAPE CHANGE DISPLAY FUNCTION

BACKGROUND OF THE INVENTION

1. Field of the Invention

The invention relates to a navigation apparatus having a function to give a visual effect as if a plane-like map is looked down from an upper oblique direction and also a function to stereoscopically display buildings, mountains, and the like being displayed on a map.

2. Description of Related Art

In recent years, studies have been made for a navigation apparatus having both of a bird's eye view displaying function which gives a visual effect as if a plane-like map is looked down from an oblique upper direction and a function to stereoscopically display main target objects (buildings, landmarks, mountains, and the like) serving as a help to recognize a feature of the map.

In the navigation apparatus with the stereoscopic display function, however, there is a problem such that, since the buildings, mountains, and the like are stereoscopically displayed, the buildings, mountains, and the like hide other important information on the map or it is difficult to recognize a route which has been preset and on which a vehicle will pass and the present position of the vehicle.

For example, intersecting points are hidden as being obstructed by the building, so that information such as the shape of the intersecting point or the like, which has a high priority and is necessary for the user to utilize the navigation apparatus, drops out.

As mentioned above, in the map displayed in a state in which the building or the like hides the important information on the map, only obscure information can be derived at a corner where clear information is necessary and it is difficult for the user to arrive at a target place.

OBJECTS AND SUMMARY OF THE INVENTION

The present invention was made in view of the above problems and it is an object of the invention to provide a novel navigation apparatus which can preferentially recognize important information on a map which is hidden by a building, a mountain, or the like that is stereoscopically displayed and can easily recognize a set route and a present position of a vehicle.

According to the first aspect of the invention, a navigation apparatus comprises: a recording medium in which at least map data having roads and shape data which is included in the map data and forms main landmark objects to recognize a feature of the map have been recorded; an image forming unit for forming image information representing a map by the map data viewed from a desired sight point position on the basis of the map data and the shape data; a display unit for displaying on the basis of the image information formed by the image forming unit; and a control unit for controlling the recording medium, image forming unit, and display unit, wherein the navigation apparatus has a shape data changing unit and the control unit controls the shape data changing unit to change at least a part of the shape data on the basis of at least the map data and also controls the image forming unit to form image information based on the map data, shape data, and shape data changed by the shape data changing unit.

According to the second aspect of the invention, in the navigation apparatus according to the first aspect of the invention, when an overlapped portion of a landmark object and a road is detected in the image information to be displayed by the display unit, the control unit controls the shape data changing unit to change the shape data of the overlapped landmark object.

According to the third aspect of the invention, in the navigation apparatus according to the first aspect of the invention, when overlapped portions of a plurality of landmark objects are detected in the image information to be displayed by the display unit, the control unit controls the shape data changing unit to change at least one of the shape data of the overlapped landmark objects which are closer to a sight point position.

According to the fourth aspect of the invention, in the navigation apparatus according to the first aspect of the invention, the control unit controls the shape data changing unit to change the shape data of the landmark objects in a range which has been set in accordance with the present position of a vehicle.

According to the fifth aspect of the invention, in the navigation apparatus according to the first aspect of the invention, the control unit controls the shape data changing unit to change the shape data of the landmark objects in or out of a range for a set route which has been preset through operating means.

According to the sixth aspect of the invention, in the navigation apparatus according to the first aspect of the invention, the control unit controls the shape data changing unit to change the shape data of the landmark objects in or out of a range in the image information to be displayed by the display unit which has been designated through operating means.

In the navigation apparatus according to the first aspect of the invention, which comprises: a recording medium in which at least map data having roads and shape data which is included in the map data and serves as main landmark objects to recognize a feature of a map have been recorded; an image forming unit for forming image information of a map by the map data viewed from a desired sight point position on the basis of the map data and the shape data; a display unit for displaying on the basis of the image information formed by the image forming unit; and a control unit for controlling the recording medium, image forming unit, and display unit, the control unit controls a shape data changing unit to change at least a part of the shape data on the basis of at least the map data and also controls the image forming unit to form image information based on the map data, shape data, and shape data changed by the shape data changing unit. Therefore, important information on the map hidden by the buildings, mountains, and the like which were stereoscopically displayed can be preferentially recognized and the set route or the present position of the vehicle can be easily recognized.

In the navigation apparatus according to the second aspect of the invention, when an overlapped portion between a landmark object and a road is detected in the image information to be displayed by the display unit, the control unit controls the shape data changing unit to change the shape data of the overlapped landmark object, so that road information hidden by the buildings which were stereoscopically displayed can be preferentially recognized.

In the navigation apparatus according to the third aspect of the invention, when overlapped portions of a plurality of landmark objects are detected in the image information to be displayed by the display unit, the control unit controls the shape data changing unit to change at least one of the shape data of the overlapped landmark objects which are closer to a sight point position, so that even if a building standing as a landmark object at a position near an intersecting point is hidden by another building which was stereoscopically displayed, the building standing as a landmark object can be preferentially recognized.

In the navigation apparatus according to the fourth aspect of the invention, the control unit controls the shape data changing unit to change the shape data of the landmark objects in a range set in accordance with the present position of a vehicle, so that the present position of the vehicle on a map on which buildings, mountains, and the like are stereoscopically displayed can be easily recognized.

In the navigation apparatus according to the fifth aspect of the invention, the control unit controls the shape data changing unit to change the shape data of the landmark objects in or out of a predetermined range for a set route which has been preset through operating means, so that the set route on a map on which buildings, mountains, and the like are stereoscopically displayed can be easily recognized.

In the navigation apparatus according to the sixth aspect of the invention, the control unit controls the shape data changing unit to change the shape data of the landmark objects in or out of a predetermined range in the image information to be displayed by the display unit designated through operating means, so that information of a map such as a road state of a range which the operator wants to know on a map on which buildings, mountains, and the like are stereoscopically displayed can be clarified.

BRIEF DESCRIPTION OF THE DRAWINGS

FIG. 1 is a block diagram showing a schematic construction of a navigation apparatus in conceivable technique;

FIGS. 2A to 2D are diagrams showing an example of a data structure of map data and shape data in a recording medium 4 of the navigation apparatus in the conceivable technique;

FIG. 3 is an operation flowchart of a control unit 1 for the navigation apparatus in the conceivable technique to display a map, buildings, and the like;

FIG. 9 is a flowchart showing a state in which the image forming unit 3 of the navigation apparatus in the conceivable technique performs a hidden surface process to the image information which was converted for display of a projected image;

DETAILED DESCRIPTION OF THE PREFERRED EMBODIMENTS

Figure 3:
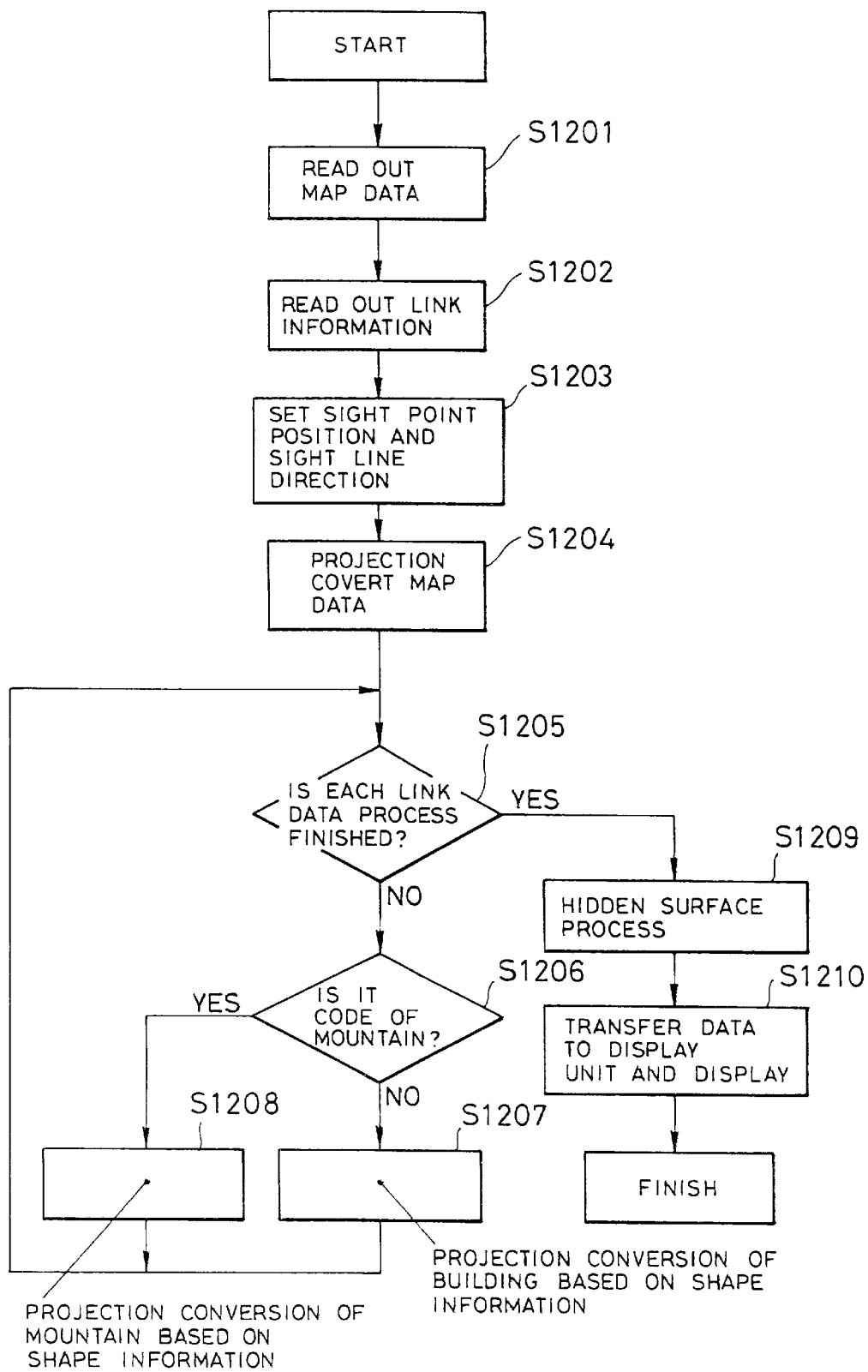

Prior to describing embodiments in detail, a possible construction with respect to a navigation apparatus having a function to stereoscopically display buildings, mountains, and the like will now be described.

As navigation apparatus mentioned above, for instance, a construction as shown in FIG. 1 is conceivable.

The navigation apparatus shown in FIG. 1 comprises a control unit 1, an operation unit 2, an image forming unit 3, a recording medium 4, an image display unit 5, a vehicle position measuring unit 6, a program ROM 7, and an RAM 8.

In FIG. 1, the control unit 1 controls the whole navigation apparatus by properly using the RAM 8 in accordance with a program stored in the program ROM 7.

The vehicle position measuring unit 6 measures the present position of a vehicle by a GAPS (Global Positioning System) receiver (not shown), a gyro sensor, and the like.

The operation unit 2 enables a manual input setting of a sight point position, a sight line direction, a display position on a map, or the like. The input set information is outputted to the control unit 1.

Various data such as map data, shape data of buildings, mountains, and the like is stored in the recording medium 4. Based on the control of the control unit 1, the map data including the present position of the vehicle or the position designated by the operating unit 2 is read out by data access means (not shown) and is stored into the RAM 8.

The image forming unit 3 executes a "projection converting process" for obtaining image information of the map data and the shape data of the buildings, mountains, etc., as being projected to a projection surface (display surface) on the basis of the map data stored in the RAM 8, the shape data of the buildings, mountains, etc. Which was linked to the map data and held in the RAM 8, the sight point position, and the sight line direction and a hidden surface process for the image information obtained and sends the resultant processed image information to the image display unit 5.

The image display unit 5 performs a display according to the image information received.

The above construction is an outline of the navigation apparatus.

FIGS. 2A to 2D show an example of structures of the map data and shape data in the recording medium 4 in FIG. 1.

FIG. 2A shows an outline of the data structure.

The various data held in the recording medium 4 is divided into the map data and shape data of the buildings, mountains, etc. As shown in FIG. 2A.

The map data is constituted by: map information to treat a map itself; and link information indicative of the positions of the buildings, mountains, etc., existing in the map displayed and an address in which the shape data of the buildings, mountains, etc. Has been written.

The shape data is constituted by a code, a header 1, peculiar information, and shape information as shown in FIG. 2B.

The shape information indicates a shape of each of the buildings, mountains, etc. On the map.

The code has a role of an identifier indicative of a building or a mountain. The header 1 indicates a data length for each of the mountains and buildings.

The peculiar information has information, such as the name of a mountain or building or the like, peculiar to it.

The shape information for buildings and that for mountains are different.

FIGS. 2C and 2D show data structures of the shape information for mountains and that for buildings.

In FIG. 2C showing the shape data of the mountain, it is constituted by a header 2, contour data, height information, and color information. Each contour data is constituted by contour point coordinates constructing each contour line.

The header 2 is constituted by the number of contour lines and the number of coordinates of every contour line.

In FIG. 2D showing the shape information of the building, it is constituted by a header 3, coordinates information, height information, and color information.

The header 3 is constituted by the number of coordinates in one building.

The operation of the navigation apparatus constructed by the above apparatuses will now be described in detail. The operation is mainly carried out by the control unit 1. FIG. 3 shows an operation flowchart of the control unit 1 for the navigation apparatus in FIG. 1 to display a map, buildings, and the like.

First in step S1201, the map data including the present position of the vehicle which is derived from the vehicle position measuring unit 6 and the display position designated by the operation unit 2 is read out from the recording medium 4 into the RAM 8.

In step S1202, the shape data of the mountains, buildings, etc. On the map is read out on the basis of the link information in the map data read out to the RAM 8.

In step S1203, the sight point position and sight line direction indicating from which sight point position on the map to the sight line direction the operator observed are set. For example, a driver's seat is set to the sight point position and the sight line direction is set in the progressing direction. The sight point position and the sight line direction can be also set by the operation unit 2.

In step S1204, the image information of the map data being projected onto the projection surface, is formed on the basis of the map data read out to the RAM 8, the sight point position, and the sight line direction, thereby performing a projection conversion of the map data.

Figure 11:
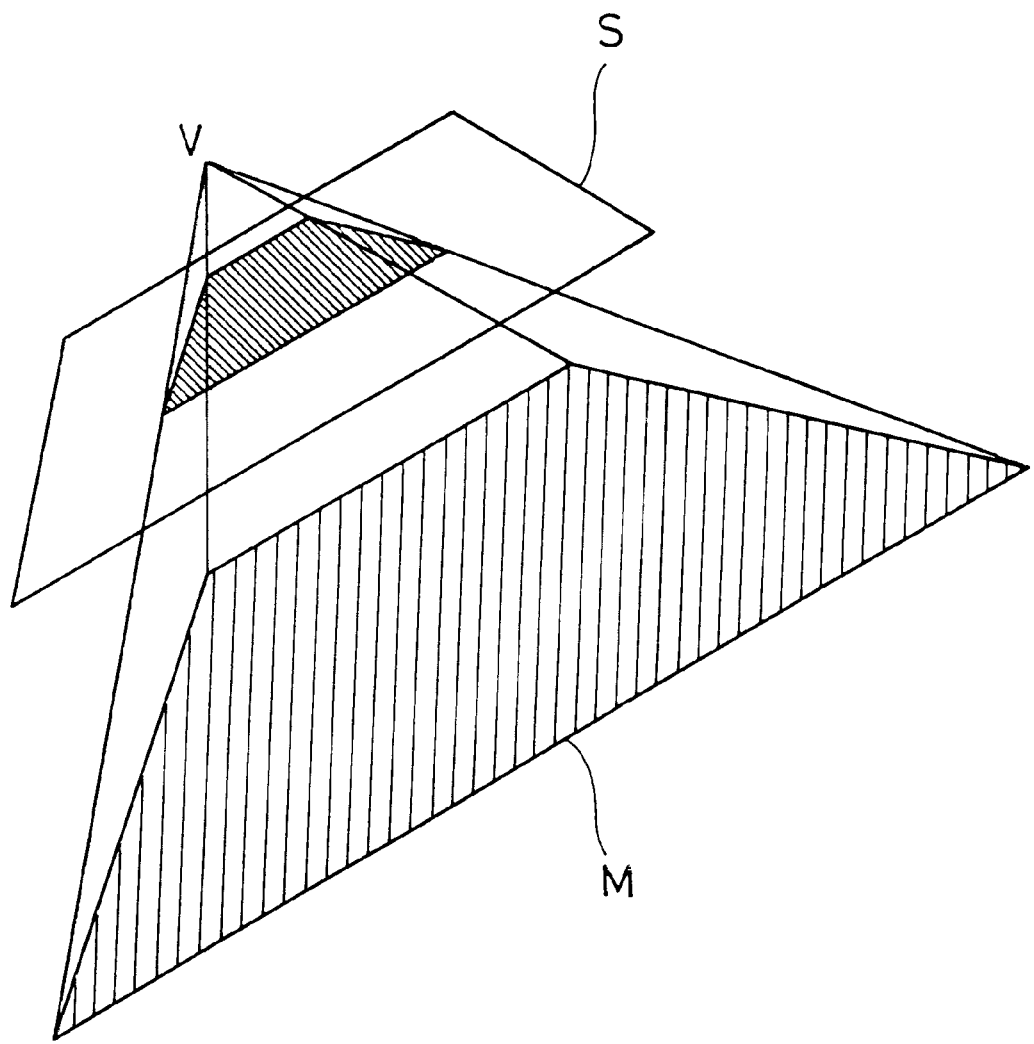
FIG. 11 is a diagram for explaining a state in which the image forming unit 3 of the navigation apparatus in the conceivable technique projection converts map data.

The process in step S1204 can be realized by obtaining image information which is obtained by projecting, onto a projection surface S, a map by the map data M read into the RAM 8 by looking it down from a sight point position V. The details of a projection converting method of the map data is omitted here as shown in, for example, FIG. 11.

In step S1205, a check is made to see if the projection converting process of all of the shape data has been completed. If NO, the processing routine advances to step S1206.

In step S1206, whether the shape data relates to the mountain data or building data is discriminated by the code in FIGS. 2A to 2D. In steps S1207 and S1208, the image information of a view obtained by projecting the mountain or building onto the projection surface is formed on the basis of the sight point position, the sight line direction, and the shape data of the mountain or building, thereby performing the projection conversion of the mountain or building.

In step S1205, when the projection converting process of all of the shape data is completed, the hidden surface process is executed in step S1209 to the image information formed. The details of the hidden surface process will be described later.

In step S1210, the image information which was subjected to the hidden surface process is transferred to the image display unit 5 and a display according to the image information is performed.

The projection conversion of the map data and shape data, the hidden surface process, and the like are executed in the image forming unit 3 in FIG. 1. The control unit 1 properly transfers necessary data and the like.

Methods of projection converting the shape data of the buildings and mountains in steps S1207 and S1208 are shown in FIGS. 4 and 5 and FIGS. 6 and 7, respectively.

Figure 4:
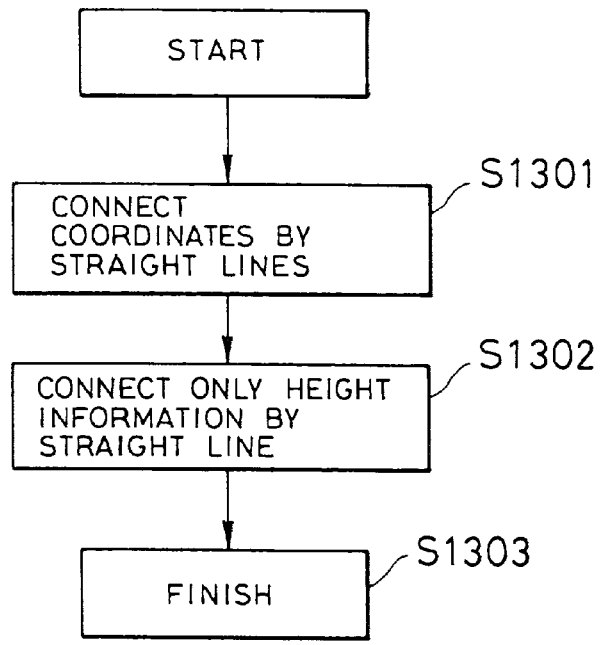
FIG. 4 is a flowchart showing processes in which an image forming unit 3 of the navigation apparatus in the conceivable technique projection converts shape data of a building.
Figure 5:
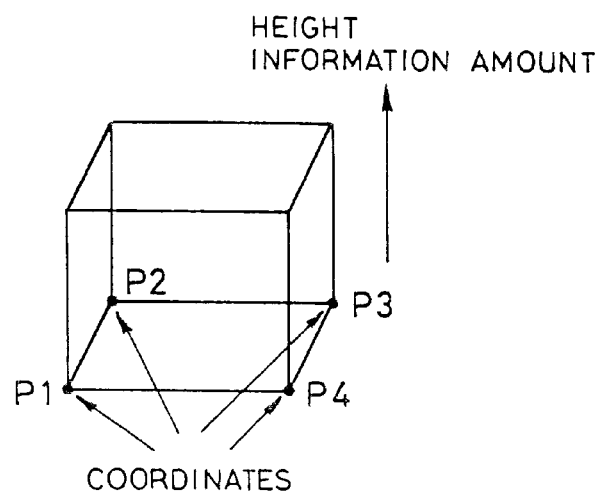
FIG. 5 is a diagram corresponding to FIG. 4.

In FIG. 4, first in step S1301, as shown in FIG. 5, display coordinates P1 to P4 are obtained on the basis of the building shape data, sight point position, and sight line direction mentioned above and the respective coordinates are connected by straight lines.

In step S1302, line segments are connected in the height direction on the basis of height information, thereby forming a projection diagram of the building.

Figure 6:
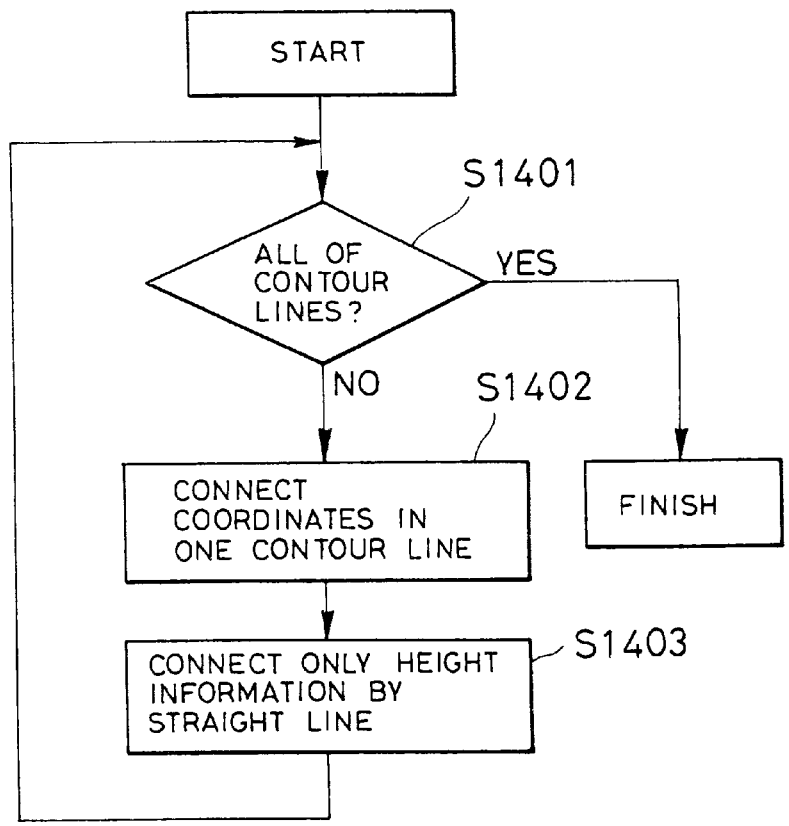
FIG. 6 is a flowchart showing processes in which the image forming unit 3 of the navigation apparatus in the conceivable technique projection converts shape data of a mountain.
Figure 7:
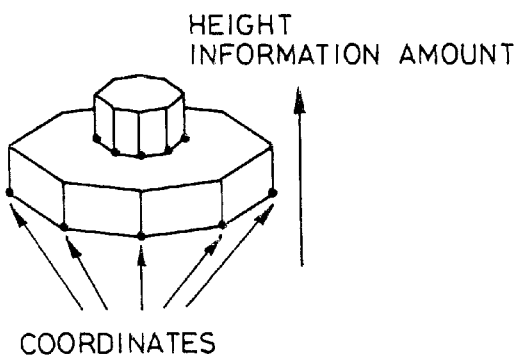
FIG. 7 is a diagram corresponding to FIG. 6.

In FIG. 6, first in step S1402, as shown in FIG. 7, display coordinates of each contour line are obtained on the basis of the mountain shape data, sight point position, and sight line direction mentioned above. The respective coordinates are connected by straight lines.

In step S1403, line segments are connected in the height direction on the basis of the height information.

The above processes are executed only a number of times corresponding to the number of contour lines and the resultant data is piled, thereby forming an image of a mountain (step S1401).

The hidden surface process which is executed in step S1209 in FIG. 3 will now be described in detail with reference to FIGS. 8A to 8C and 9.

Figure 8A:
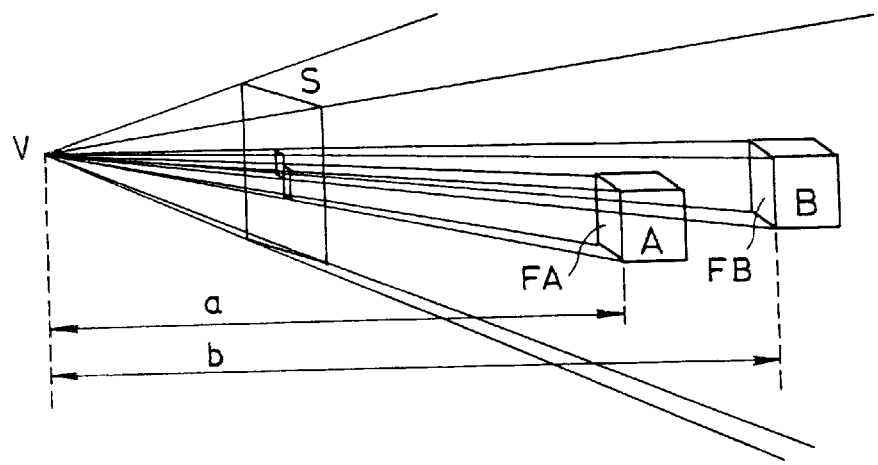
FIGS. 8A to 8C are diagrams showing a state in which the image forming unit 3 of the navigation apparatus in the conceivable technique performs a hidden surface process to the image information which was converted for display of a projected image.

FIG. 8A shows a state in which a projection diagram is formed onto the projection surface (screen S) of buildings A and B in the case that the buildings A and B are seen from the sight point position V.

For simplicity of explanation, it is assumed that a surface FA of the building A and a surface FB of the building B are located in parallel with the screen S and a distance from the sight point position V to the surface FA is set to (a) and a distance from the sight point position V to the surface FB is set to (b).

FIG. 9 is a flowchart showing a procedure for projection converting the buildings A and B onto the projection surface and, further, executing the hidden surface process.

First in step S1601, the building A is "projection converted" (converted for projection) onto the screen S. A result of the projection conversion is shown in FIG. 8B.

Figure 8B:
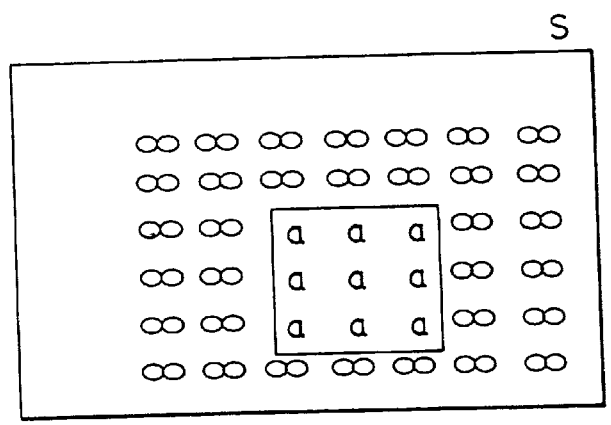

FIG. 8B shows a state in which the image information of the case that the building A is "projection converted" onto the screen S is obtained on the basis of the shape data of the building A and the preset sight point position and sight line direction. The image information is constituted by information which each pixel constructing the image has.

The information which each pixel has in FIG. 8B is constituted by, for example, the color information that is obtained from the data structure of FIG. 2D and the distance value from the sight point position to an object to be displayed. However, only the distance value from the sight point position to the displaying object is shown in FIGS. 8B and 8C for simplicity of explanation.

That is, the image of the building A on the screen S is constituted by pixels having the information (a) (distance value from the sight point position V) as shown in FIG. 8B and the information of the other pixels are set to, for example, ∞ (infinite).

In a manner similar to the above, in step S1602, the image information of the case that the building B is projection converted onto the screen S is obtained. A result is shown in FIG. 8C.

Figure 8C:
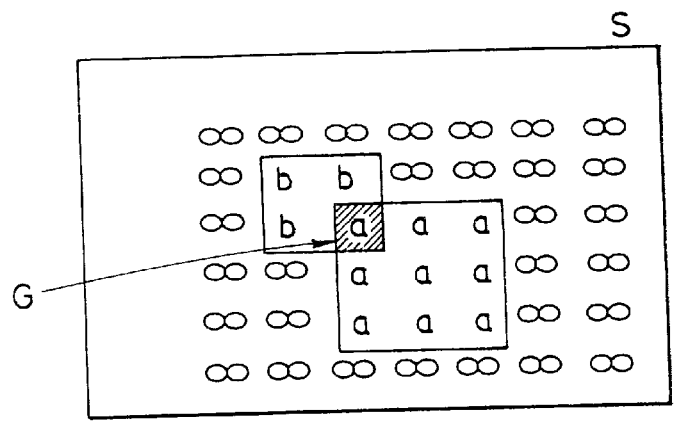

In this case, if an arbitrary pixel corresponds to a plurality of displaying objects, namely, when a portion (overlapped pixel) in which the building B when it is seen from the sight point position V is hidden by the building A exists as shown in FIG. 8C (the processing routine is branched to YES in step S1603), both of the image information in the overlapped pixel are compared in step S1604.

That is, the distance value (a) of the pixel of the building A and the distance value (b) of the pixel of the building B are compared. When a>b, namely, when it is decided that the building A exists at a position farther than the building B when they are seen from the sight point position V, the color information of the pixel of an overlapped portion G is specified by the color information of the building B and a corresponding image is drawn. On the contrary, when b>a, namely, when it is determined that the building B exists at a position farther than the building A, the color information of the pixel of the overlapped portion G is specified by the color information of the building A and a corresponding image is drawn (steps S1605, S1606). The example of FIG. 8C relates to the case of b>a as shown in FIG. 8A.

By the hidden surface process mentioned above, as shown in FIG. 8C, a state in which a part of the building B is hidden by the building A is displayed and far and near states of a plurality of objects are clearly understood.

In the navigation apparatus with the stereoscopic display function, since buildings, mountains, and the like are stereoscopically displayed, a problem such that the building, mountain, or the like hides the other important information on the map or it is difficult to recognize the route which has been preset for a schedule of passing or the present position of the vehicle occurs.

Explanation will now be made with reference to FIG. 10A as an example. The intersecting point is hidden by a building B1 and information such as a shape of an intersecting point or the like having a high priority which is necessary when the user uses the navigation apparatus drops out.

According to the map displayed in a state in which the buildings or the like hide the important information on the map as mentioned above, only obscure information is derived at a corner where clear information is necessary and it is difficult to reach the target place.

Figure 10A:
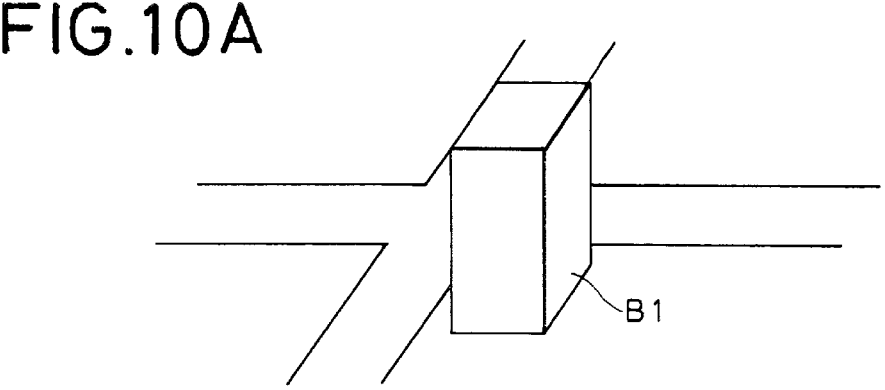
FIGS. 10A to 10D are diagrams showing display examples by the conceivable technique.
Figure 10B:
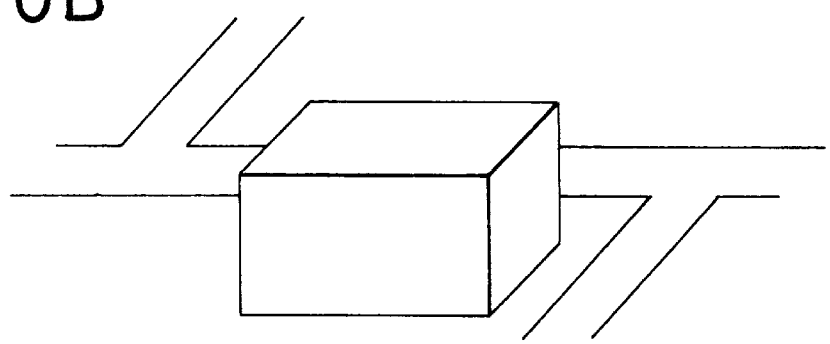
Figure 10C:
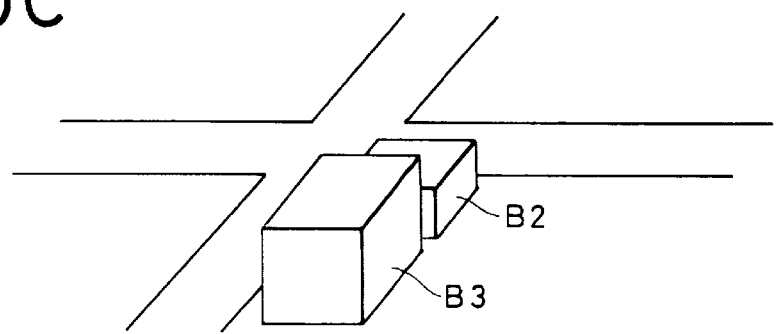
Figure 10D:
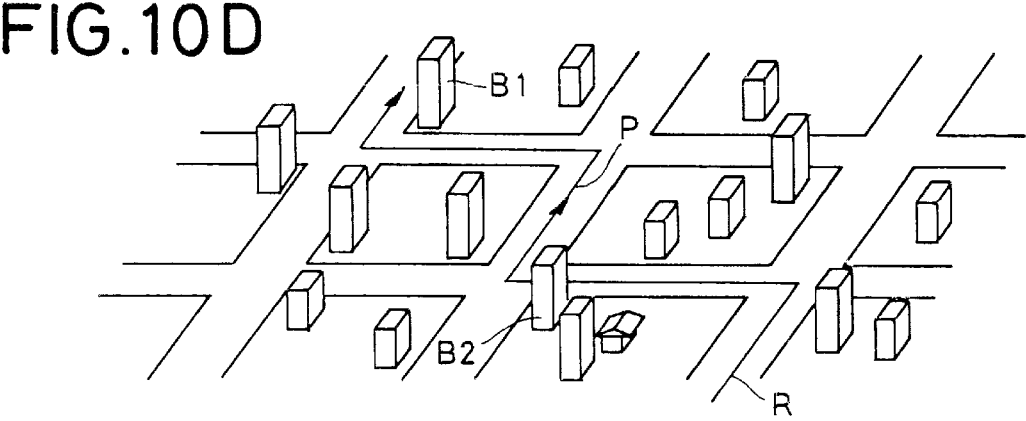

In the example of FIG. 10D, it is difficult to recognize a set route R and a present position P of the vehicle and it is not easy to move along the set route according to the display of the map as mentioned above.

EMBODIMENTS

Embodiments of the invention will now be described in detail hereinbelow with reference to the drawings.

First Embodiment

Figure 12:
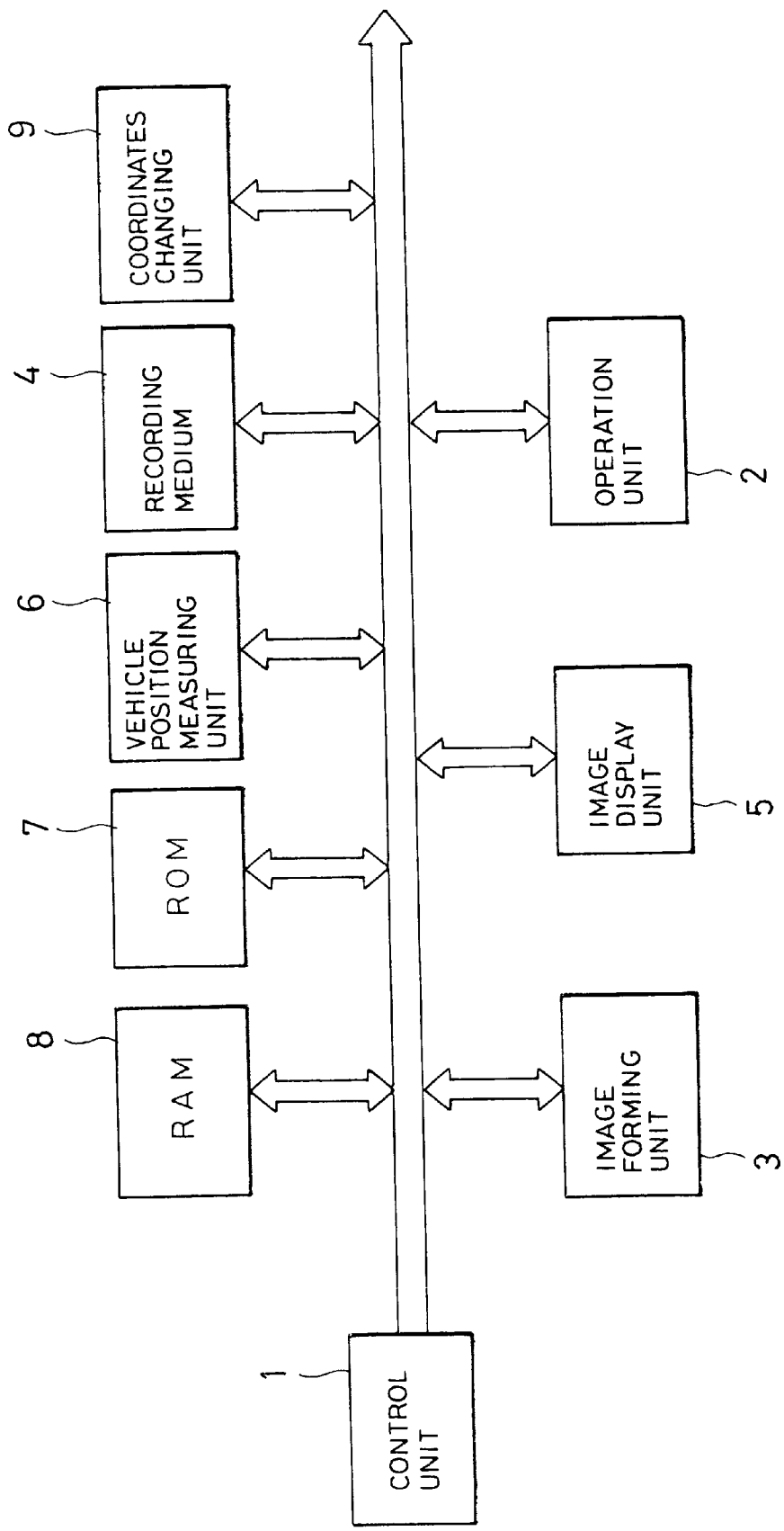
FIG. 12 is a block diagram showing a schematic construction of navigation apparatuses in the first and second embodiments of the invention.

FIG. 12 is a block diagram showing a schematic construction of a navigation apparatus having a stereoscopic display function of buildings, mountains, etc. in the embodiment.

The navigation apparatus of FIG. 12 is formed by adding a coordinates changing unit 9 to the construction of FIG. 1 and intends to change height information in the shape data of buildings, mountains, etc. by the coordinates changing unit 9 by a method, which will be explained later.

Figure 13:
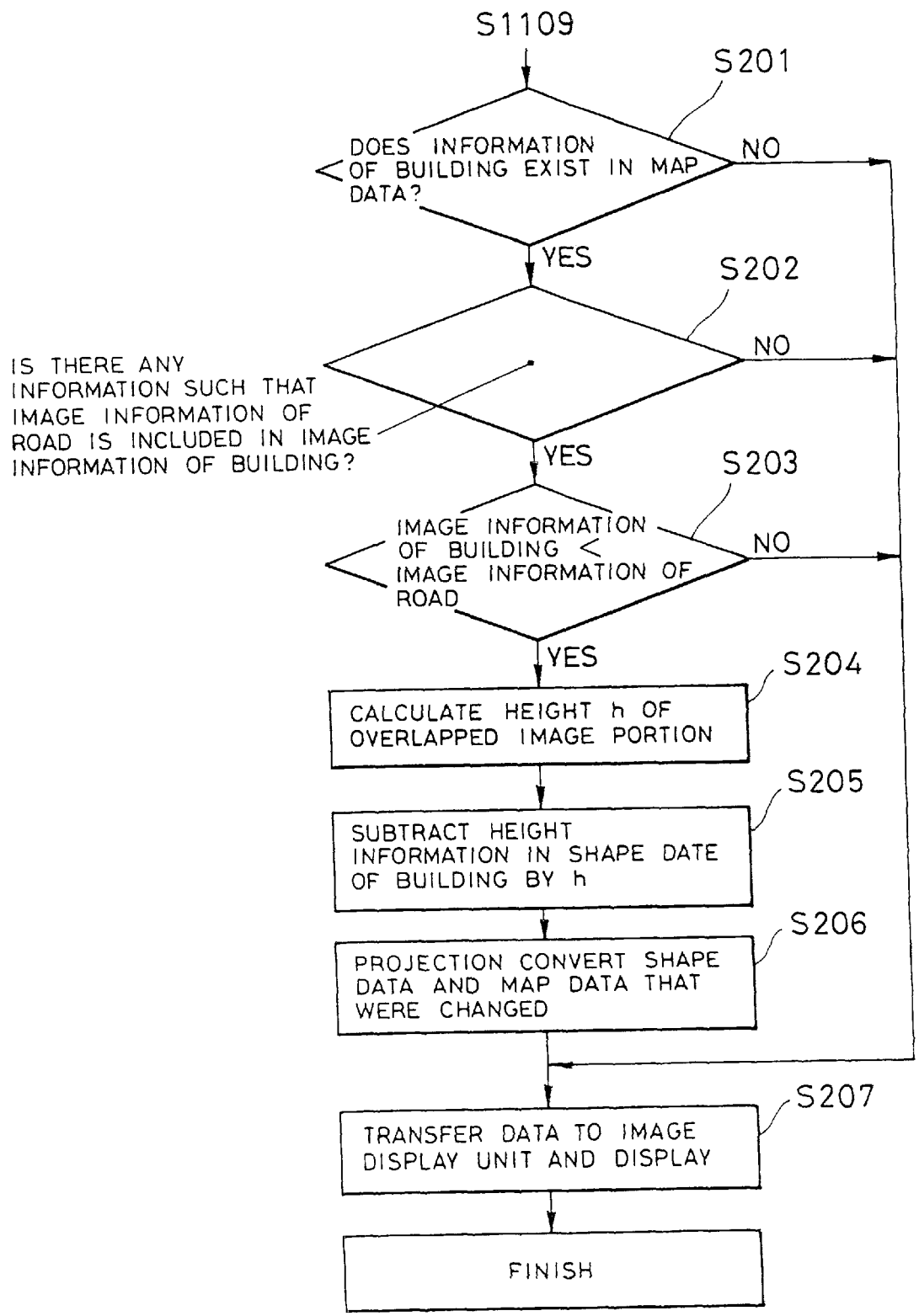
FIG. 13 is a flowchart showing the operation of the navigation apparatus in the first embodiment of the invention.

The operation of the navigation apparatus in the embodiment will now be described hereinbelow. The operation is mainly carried out by the control of the control unit 1. An operation flowchart of the control unit 1 in the navigation apparatus in FIG. 12 is shown in FIG. 13.

First, the present position of the vehicle, the map data including the position designated by the operation unit 2, and the shape data of buildings, mountains, etc. are read out from the recording medium 4 and the projection converting process and the hidden surface process are executed in a manner similar to steps S1201 to S1209 in FIG. 3.

In the embodiment, the height information of the shape data of buildings, mountains, etc. is further changed as necessary.

The above processes are executed in steps S201 to S207 in FIG. 13 and will be explained in detail hereinbelow with reference to FIG. 14 as an example.

First in step S201, a check is made to see if link information indicative of the presence of the building exists in the map data to be displayed. If YES, the processing routine advances to step S202.

Figure 14A:
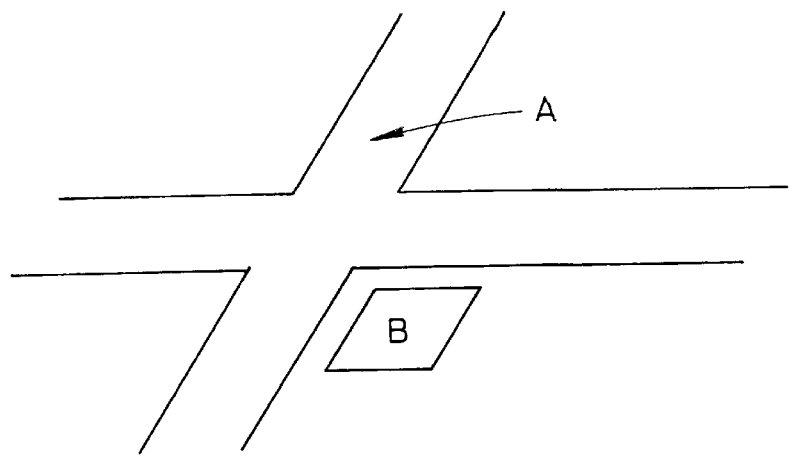
FIGS. 14A to 14C are diagrams showing the operation of a coordinates changing unit 9 of the navigation apparatus in the first embodiment of the invention.

For example, in case of FIG. 14A, it is determined that there is information indicating that the building B exists at a position near an intersecting point A.

Figure 14B:
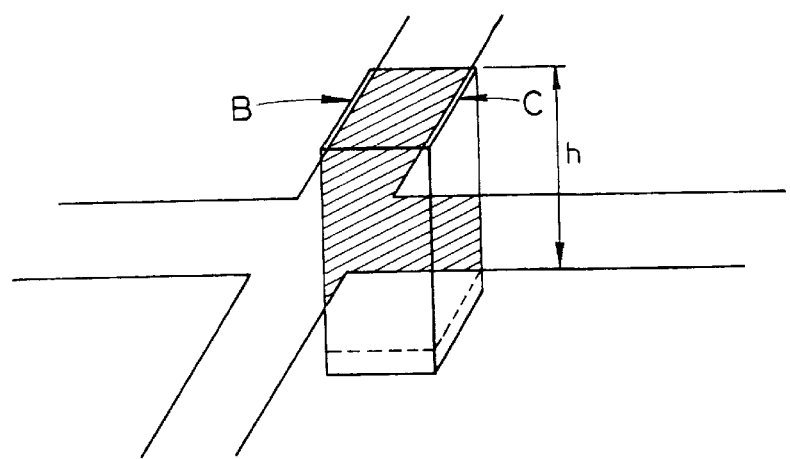

In step S202, a check is made to see if the overlapped portion with the image information of the road exists in the image constructing the building on the projection diagram formed in steps S1201 to S1209. For example, in case of a projection diagram as shown in FIG. 14B, a meshed portion C corresponds to the overlapped portion.

If YES in step S202, the processing routine advances to step S203 and the individual image information of the overlapped portion is compared, namely, the distance value from the sight point position is compared. For example, in case of FIG. 14B, now assuming that distance values from the sight point position to the building B and the road are respectively set to Db and Dr (for simplicity of explanation, it is assumed that each of them is constituted by one distance value), when Db<Dr, namely, when it is decided that the building B hides the road near the intersecting point when they are seen from the sight point position, the processing routine advances to step S204.

In step S204, a length from the top of the building to the lower edge of the overlapped portion is calculated. In case of FIG. 14B, h corresponds to its length.

In step S205, only the length h calculated in step S204 is subtracted from the height information in the shape data of the building by the coordinates changing unit 9. That is, if the building is displayed lower than the original height by the length h, the road hidden by the building can be seen.

In step S206, image information of the case that the image is projected onto the projection surface is obtained on the basis of the changed shape data and map data.

In step S207, the changed image information is transferred to the image display unit 5 and a corresponding image is displayed.

Figure 14C:
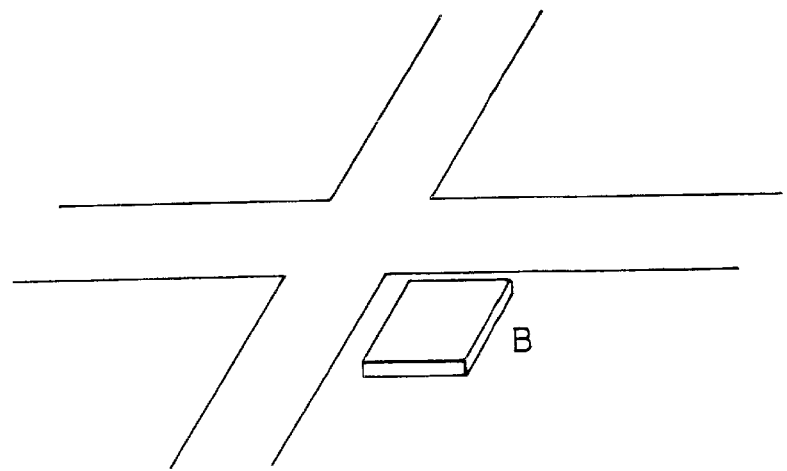

By executing the processes in steps S201 to S207 mentioned above, for instance, a display to clarify a road state near the intersecting point as shown in FIG. 14C can be performed.

The embodiment can be also applied to a case where a road other than the road near the intersecting point is obscure by the building as shown in FIG. 10A. In this case, it will be obviously understood that the road state other than the road near the intersecting point can be clearly displayed as shown in FIG. 5.

Figure 15:
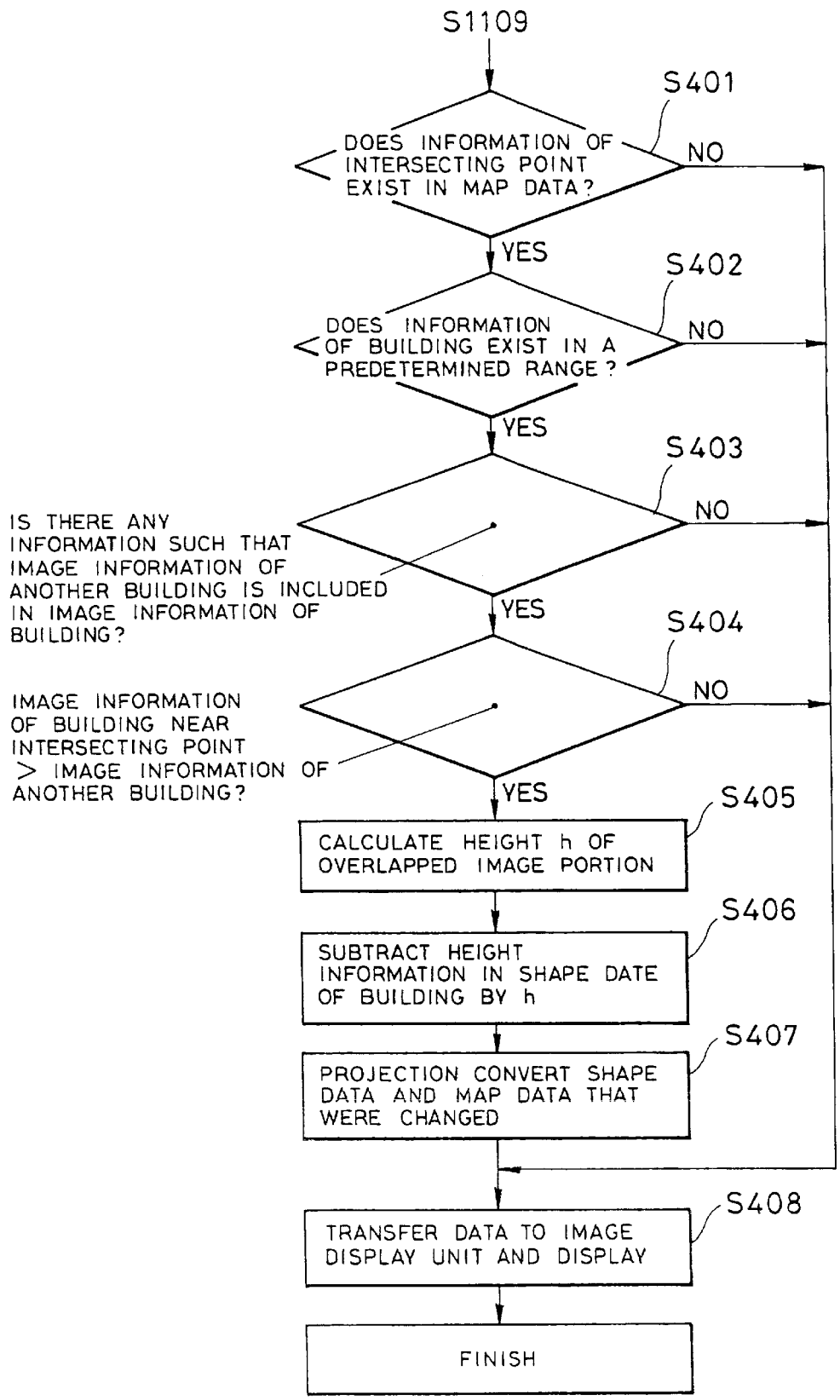
FIG. 15 is a flowchart showing the operation of the navigation apparatus in the first embodiment of the invention.

Further, the embodiment can be also applied to a case of solving a problem such that, as shown in FIG. 10B, a building B2 existing at a position near the intersecting point is hidden by another building B3 and information regarding the building B2 as a landmark object for recognizing the intersecting point is obscure. A flow of the processes in the above case is shown in FIG. 15 and will be explained in detail with reference to FIGS. 17A to 17C as an example.

First, the map data including the present position of the vehicle or the position designated by the operation unit and the shape data of buildings, mountains, etc. are read out from the recording medium 4. The projection converting process and the hidden surface process are executed in a manner similar to steps S1201 to S1209 in FIG. 12.

In step S401, a check is made to see if information of an intersecting point exists in the map data to be displayed.

The above discriminating process can be realized by, for instance, previously adding information indicative of the presence of the intersecting point into the map data and by discriminating whether the information of the intersecting point exists in a range of the map data to be displayed.

When it is decided that the information exists, a check is made in step S402 to see if link information of the buildings exists in a range of a predetermined distance from the coordinates constructing the intersecting point.

Figure 17A:
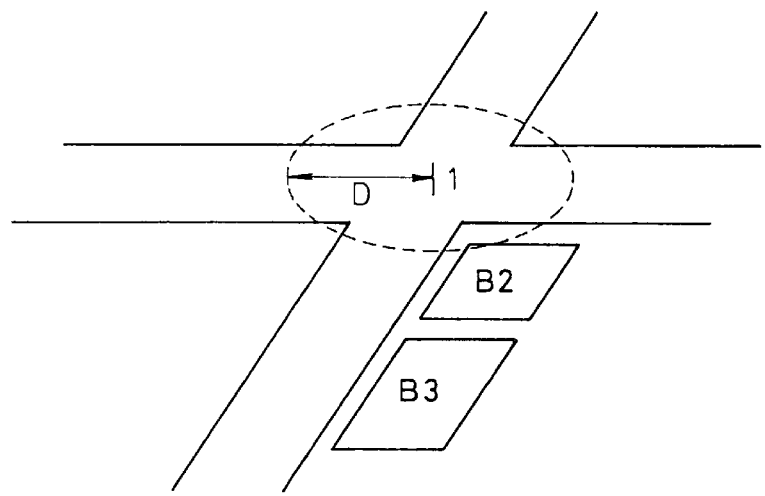
FIGS. 17A to 17C are diagrams showing the operation of the coordinates changing unit 9 of the navigation apparatus in the first embodiment of the invention.

When considering FIG. 17A as an example, link information of the building B2 exists in a predetermined distance D from coordinates 1 constructing the intersecting point.

When it is determined that it exists in step S402, step S403 follows and a check is made to see if an overlapped portion with image information of another building exists in the image information of the corresponding building.

Figure 17B:
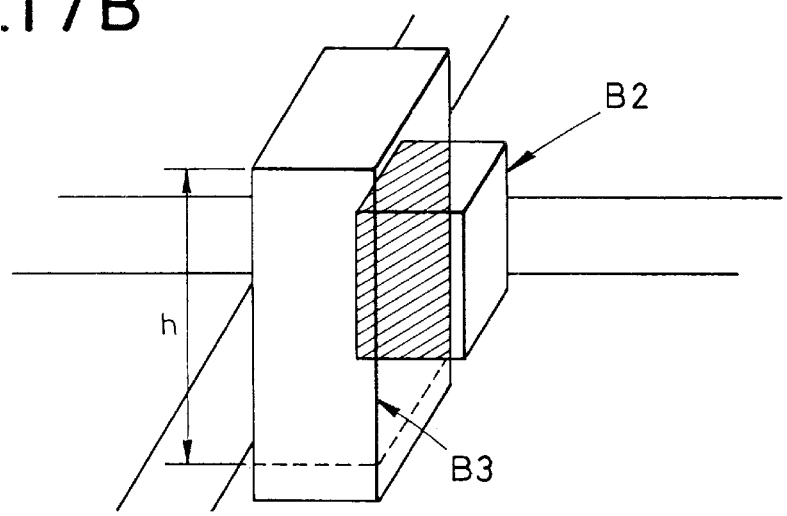

When considering FIG. 17B as an example, a meshed portion corresponds to the overlapped portion.

When it is determined in step S403 that the overlapped portion exists, step S404 follows and each image information in the overlapped portion, namely, a distance value from the sight point position is compared.

Figure 17C:
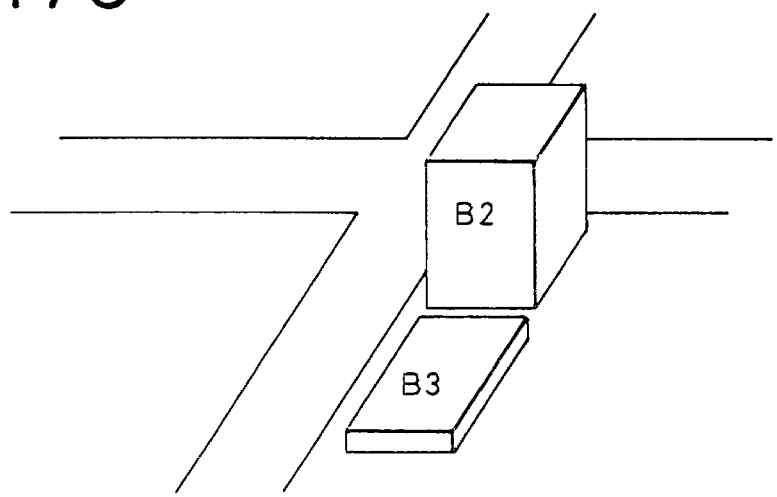

For example, now assuming that the distance values from the sight point position to the buildings B2 and B3 in FIGS. 17A to 17C are set to b2 and b3, respectively, b2>b3 in step S404, and it is possible to decide that the building B3 having the distance value which hides the building B2 exists.

In step S404, when the image information in the building existing at a position near the intersecting point, namely, an overlap of another building having a distance value smaller than the distance value of the building is detected, a height of overlapped portion is calculated in step S405.

When considering FIG. 17B as an example, the height h corresponding to a distance from the top of the building B3 to the lower edge of the overlapped portion is calculated.

In step S406, only the height (h in FIG. 17B) corresponding to the overlapped portion is subtracted from the height information in the shape data of the building in which an overlapped distance value is small. In step S407, image information of the case that the image is projected onto the projection surface is formed on the basis of the map data and the changed shaped data (FIG. 17C).

In step S408, the image information formed is transferred to the image display unit 5 and a display according to the image information is displayed.

By executing the processes in steps S401 to S408, for example, the buildings displayed as shown in FIG. 17B are displayed as shown in FIG. 17C and the buildings existing at a position near the intersecting point can be clearly displayed.

In steps S204, S205, S405, and S406, the length from the top of the building to the lower edge of the overlapped portion is subtracted from the original height information. The invention, however, is not limited to this method but it will be obviously understood that a similar effect is derived by changing the height information of the building to a height such that the portion hidden by the buildings can be known or by setting the height information of the buildings into 0 irrespective of sizes of overlapped portion.

Second Embodiment

The second embodiment to solve the subjects of the invention is now be shown below. The second embodiment relates to a navigation apparatus which can easily recognize the set route or the present position of the vehicle.

The navigation apparatus is constructed as shown in FIG. 12 and is embodied by the processes of the control unit.

Figure 18:
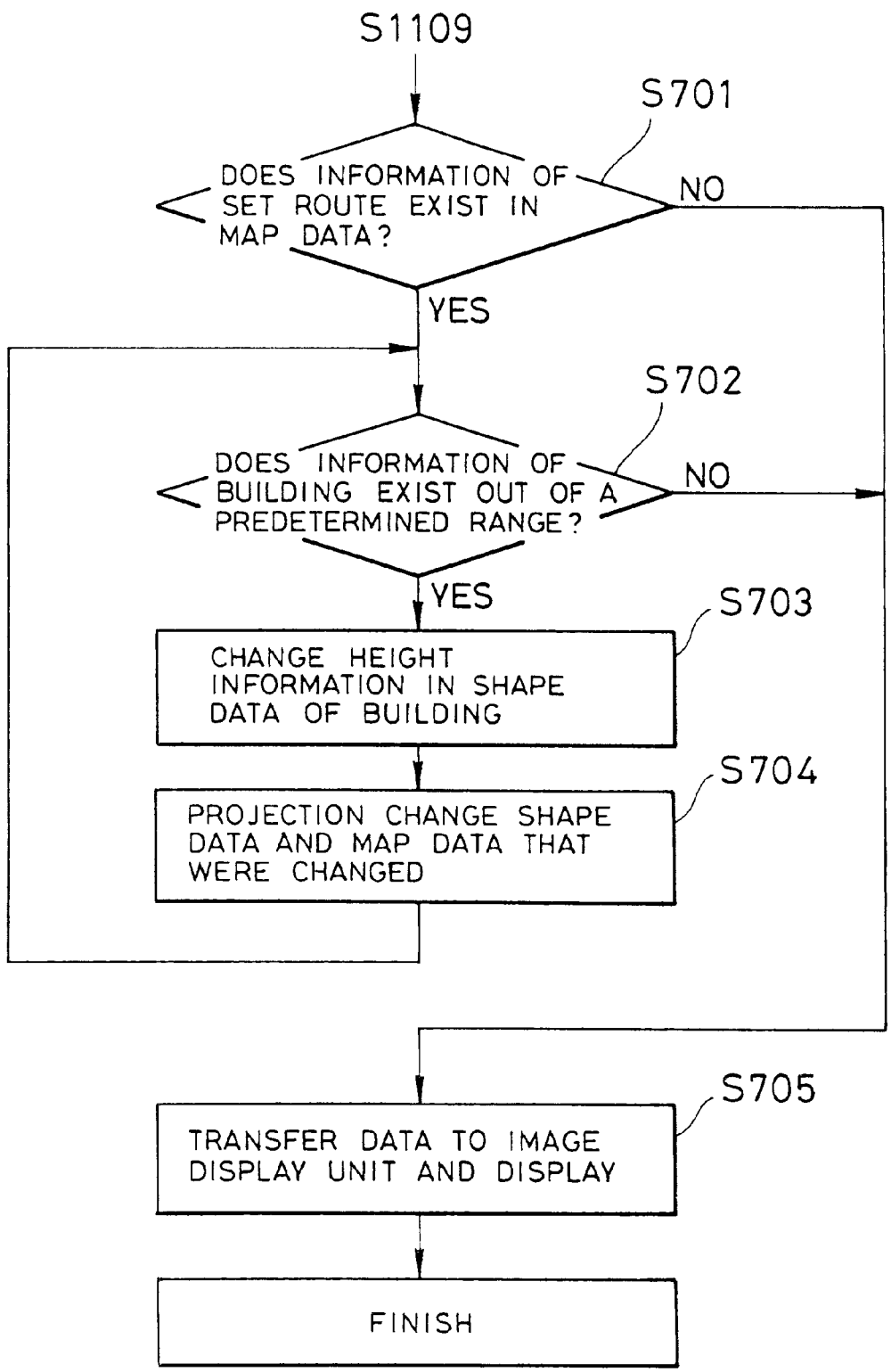
FIG. 18 is a flowchart showing the operation of the navigation apparatus in the second embodiment of the invention.

A flow for processes of the control unit 1 is shown in FIG. 18 and will be explained with reference to FIGS. 19A to 19D as an example.

First, the map data including the present position of the vehicle or the position designated by the operation unit 2 and the shape data of buildings, mountains, etc. are read out from the recording medium 4 and the projection converting process and the hidden surface process are executed in a manner similar to steps S1201 to S1209 in FIG. 3.

In step S701, a check is made to see if information of the set route (R in FIG. 19A) exists in the map data to be displayed.

Since the route information which has been preset by the navigation apparatus can be also discriminated on a 2-dimensional map, it is also possible to discriminate whether the set route exists in the map information before the projection conversion is performed instead of after completion of the projection conversion.

When it is determined in step S701 that the set route exists, step S702 follows.

Figure 19A:
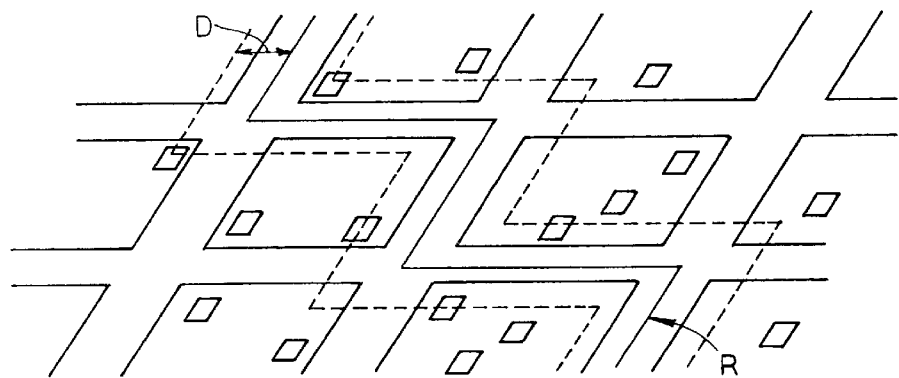
FIGS. 19A to 19D are diagrams showing the operation of the coordinates changing unit 9 of the navigation apparatus in the second embodiment of the invention.

In step S702, a check is made to see if link information indicative of the presence of the building out of a range of a predetermined distance from the set route (hatched portion in a range of the predetermined distance D in FIG. 19A) exists. When it is determined that the link information exists, step S703 follows.

In step S703, the height information in the shape data of the relevant building is changed to a low height.

In step S704, image information when it is projected onto the projection surface is formed on the basis of the changed shape data and map data.

The processes in steps S701 to S704 are executed with respect to all of the buildings existing out of the range of the predetermined distance from the set route. The image information formed is transferred to the image display unit 5 and a display according to the image information is performed in step S705.

Figure 19B:
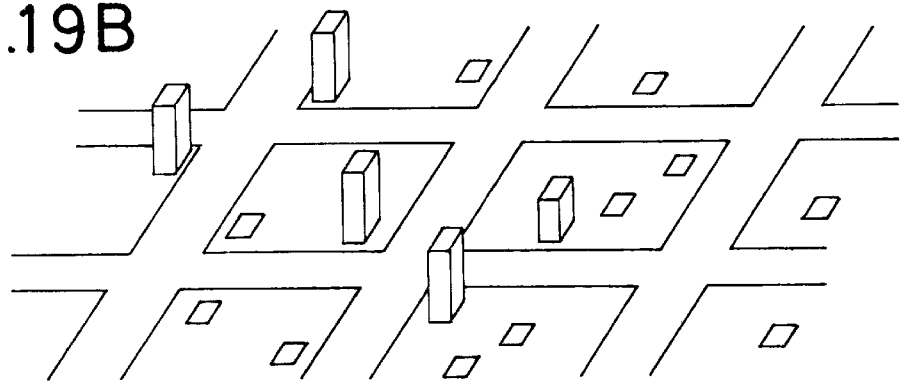

By performing the processes in steps S701 to S705, for example, when the heights of buildings existing out of the range of the predetermined distance from the set route are set to low heights, they are displayed as shown in FIG. 19B, so that the buildings on the set route can be recognized easier than those in FIG. 10D.

In step S703, the height information with respect to the buildings out of the range of the predetermined distance from the set route has been changed. In case of, on the contrary, changing the height information with respect to the buildings in the range of the predetermined distance, however, an effect such that the set route can be easily recognized is derived.

Figure 19C:
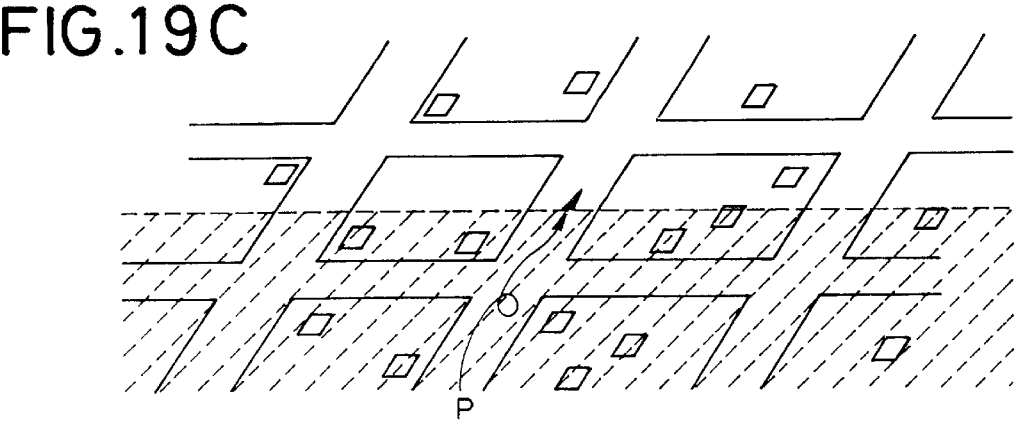
Figure 19D:
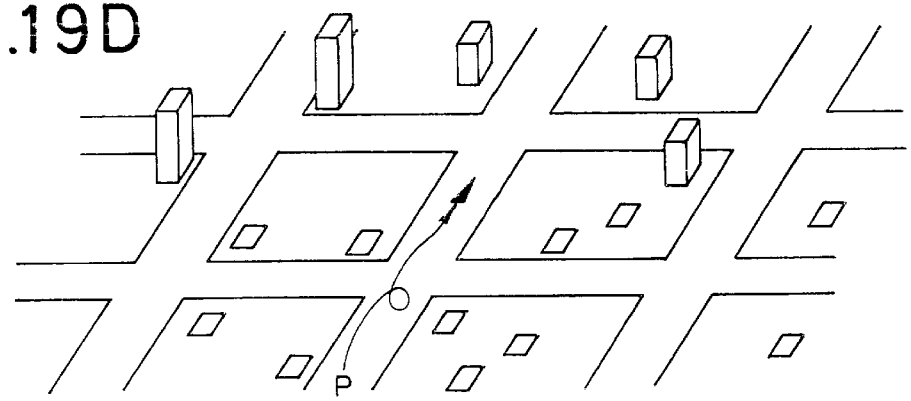

By replacing the processes in steps S701 and S702 to a process for discriminating whether the buildings exist behind (or before) the present position of the vehicle when they are seen from the progressing direction of the vehicle, for example, the height information of the buildings existing in the hatched portion in FIG. 19C is changed and the buildings are displayed as shown in FIG. 19D. The present position P of the vehicle, consequently, can be easily recognized and a situation of a map of the roads, buildings, etc. behind (or before) the present position P can be easily recognized.

Figure 20A:
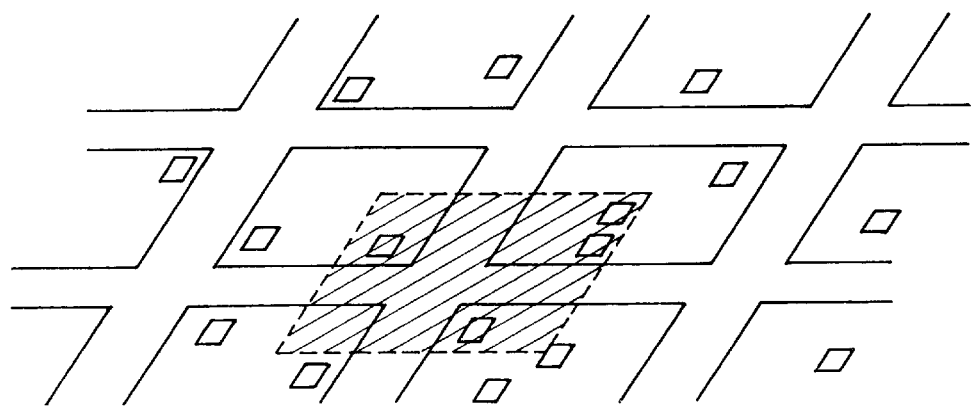
FIGS. 20A to 20C are diagrams showing the operation of the coordinates changing unit 9 of the navigation apparatus in the second embodiment of the invention.
Figure 20B:
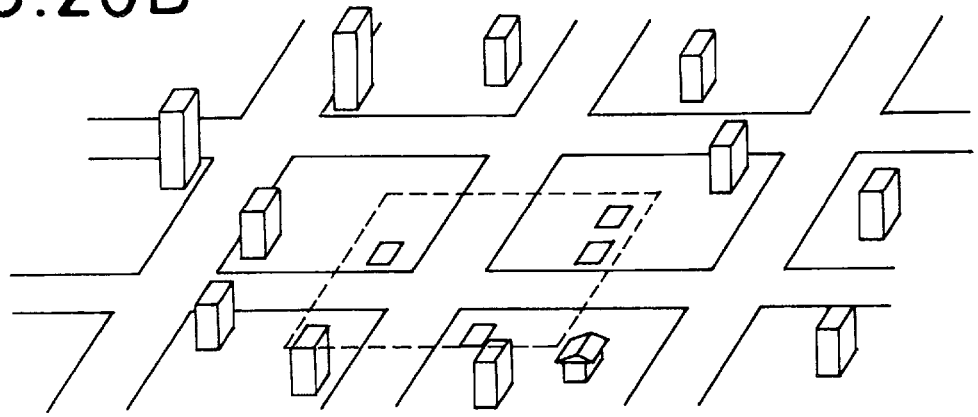

By a similar method, further, it is also possible to construct in a rule such that a desired range (for instance, hatched portion in FIG. 20A) in the map is designated by the operation unit 2 and height information of the buildings existing in the designated range (or out of the range) can be changed. With this method, the buildings are displayed as shown in FIG. 20B and it will be obviously understood that a situation of a map of the roads, buildings, etc. in a range which the operator wants to know can be clarified.

By combining the foregoing first and second embodiments, a geometrical effect of each of the combined examples can be obviously obtained.

Figure 16:
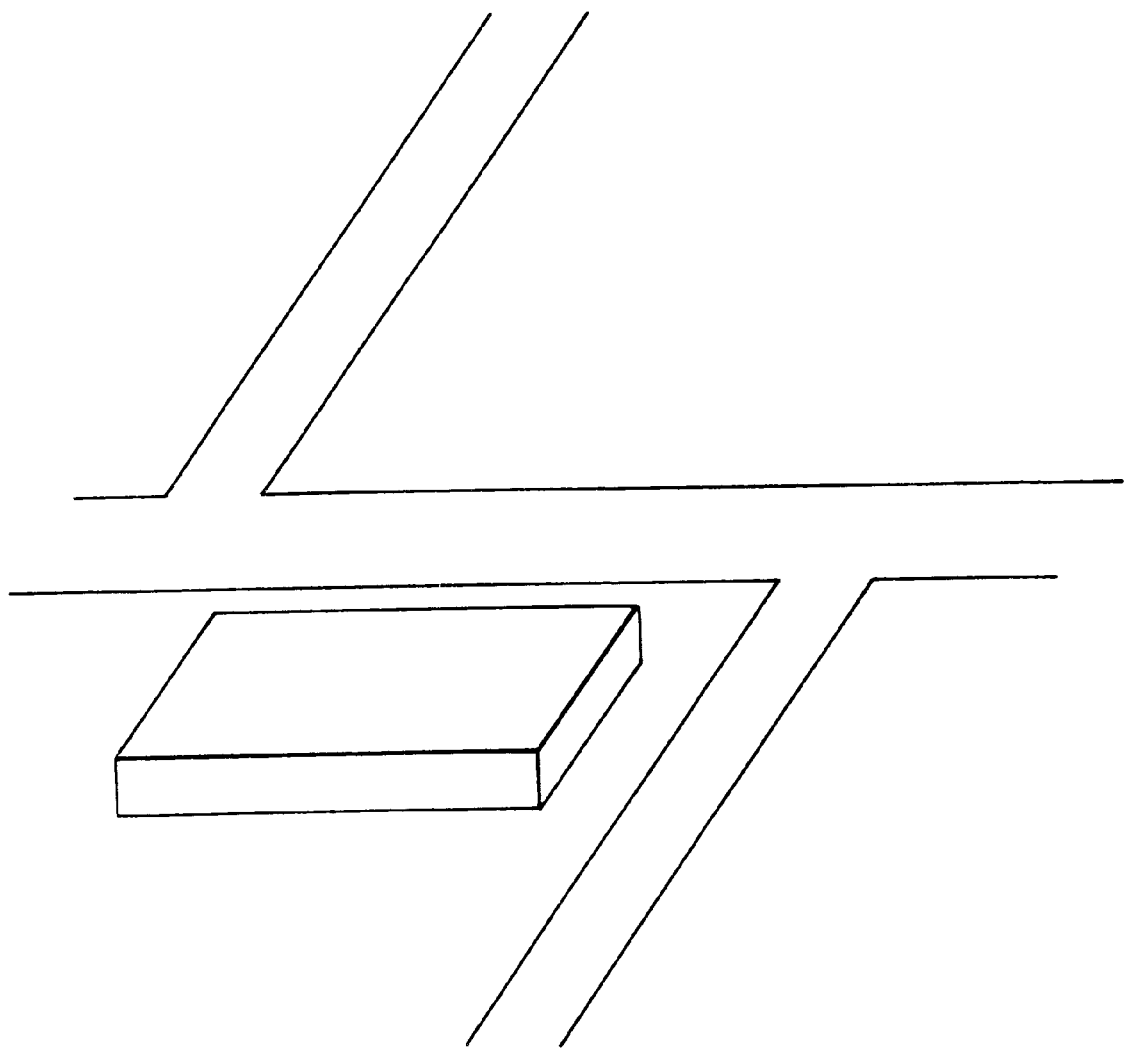
FIG. 16 is a diagram showing an effect of the navigation apparatus in the first embodiment of the invention.
Figure 20C:
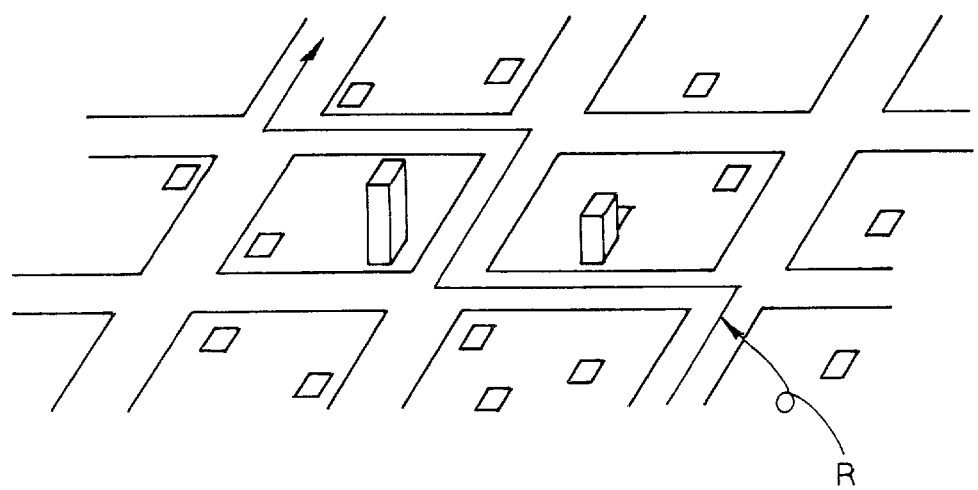

For instance, by applying the example (FIG. 19B) in which the buildings other than those along the set route are displayed at low heights and the example (FIGS. 14C and 16) in which the buildings which hide the road to FIG. 10D, the buildings other than those along the set route R in FIG. 10D and, further, buildings B1 and B2 which hide the set route are displayed at low heights, so that the buildings which hide the set route R are not displayed as shown in FIG. 20C, so that the landmark objects can be further easily recognized.

Although the above first and second embodiments have been described with respect to the buildings as landmark objects as examples, the invention is not limited to those examples but a similar effect can be also obviously derived even if the invention is applied to mountains or the like.

Since the invention has been constructed as mentioned above, in the navigation apparatus according to the first aspect of the invention, the important information on the map hidden by the buildings, mountains, etc. Which were stereoscopically displayed can be preferentially recognized or the set route or the present position of the vehicle can be easily recognized.

In the navigation apparatus according to the second aspect of the invention, the road information hidden by the buildings which were stereoscopically displayed can be preferentially recognized In the navigation apparatus according to the third aspect of the invention, even when the building standing as a landmark object at a position near the intersecting point is hidden by another building which was stereoscopically displayed, the building standing as a landmark object can be preferentially recognized.

In the navigation apparatus according to the fourth aspect of the invention, the present position of the vehicle can be easily recognized on the map on which buildings, mountains, etc. are stereoscopically displayed, and a situation of the map of the roads, buildings, or the like on the front side (or rear side) can be clarified.

In the navigation apparatus according to the fifth aspect of the invention, the information regarding the set route on the map on which buildings, mountains, etc. are stereoscopically displayed can be easily recognized.

In the navigation apparatus according to the sixth aspect of the invention, a situation of the map of the roads, buildings, etc. in a desired range on the map on which buildings, mountains, etc. are stereoscopically displayed can be clarified.

The present invention has been described above with reference to the preferred embodiments. It will be understood that a person with ordinary skill in the art can presume many variations and modifications. All of the modifications and variations are incorporated in the scope of claim for a Patent of the invention.

What is claimed is:

1. A navigation apparatus comprising:
   a recording medium having recorded therein at least map data including road data, and shape data characterizing at least an object which is included in said map data and serves as a main object for recognizing a feature of a map;
   an image forming unit for forming image information for generating a perspective image obtained when a map segment is seen from a desired viewing point, based on said map data and said shape data;
   a display unit for displaying the image information formed by said image forming unit; and
   a control unit for controlling said recording medium, said image forming unit, and said display unit; and
   a shape data changing unit;
   wherein said control unit controls said shape data changing unit to change at least a part of said shape data based on at least said map data, and also controls said image forming unit to form the perspective image based on said map data, said shape data, and shape data changed by said shape data changing unit.

2. An apparatus according to claim 1, wherein when said image information contains an overlapped portion of the main object and the road, said control unit controls said shape data changing unit to change the shape data of said main object in an area of said overlapped portion.

3. An apparatus according to claim 1, wherein when said image information contains overlapped portions of a plurality of main objects, said control unit controls said shape data changing unit to change shape data of at least one of said main objects that is closer to said viewing point position, in an area of said overlapped portion.

4. An apparatus according to claim 1, wherein said control unit controls said shape data changing unit to change shape data of main objects situated within a selected range from the present position of the vehicle.

5. An apparatus according to claim 1, wherein said control unit controls said shape data changing unit to change the shape data in or out of a predetermined range relative to a route which has been preset through an operating means.

6. An apparatus according to claim 1, wherein said control unit controls said shape data changing unit to change the shape data of main objects in or out of a predetermined range in the image information to be displayed by said display unit which was designated through an operating means.

7. A method of displaying navigation data for a vehicle, comprising:

providing a memory having stored therein map data including road information, and shape data for at least an object situated within the area represented by said map data;

determining a location of said vehicle;

forming image information for displaying perspective image corresponding to a view from a desired viewing point based on said map data, said shape data and location of said vehicle;

detecting areas of overlap of said shape data and said road information in said image information;

selectively modifying said shape data in said areas of overlap; and displaying said perspective image based on said map data said shape data and selectively modified shape data.

8. A method of displaying navigation data according to claim 7, wherein said shape data includes data for a plurality of objects situated within the area represented by said map data, and further comprising:

identifying additional areas of overlap of said shape data for respective objects in said image information.

9. Apparatus of displaying navigation data for a vehicle, comprising:

a memory having stored therein map data including road information, and shape data for at least an object situated within an area represented by said map data;

means for determining a location of said vehicle;

means for forming image information for displaying perspective image corresponding to a view from a desired viewing point based on said map data, said shape data and location of said vehicle;

means for detecting areas of overlap of said shape data and said road information in said image information;

means for selectively modifying said shape data in said areas of overlap; and a display unit for displaying said perspective image based on said map data, said shape data and selectively modified shape data.

10. Apparatus of displaying navigation data according to claim 9, wherein said shape data includes data for a plurality of objects situated within the area represented by said map data, and further comprising:

means for identifying additional areas of overlap of said shape data for respective objects in said image information.

* * * * *